United States Patent [19]

Donahue

[11] 4,089,001

[45] May 9, 1978

[54] RADAR MTI SYSTEM USING A NONCOHERENT TRANSMITTER

[75] Inventor: Thomas Harbison Donahue, Glendale, Calif.

[73] Assignee: International Telephone and Telegraph Corporation, New York, N.Y.

[21] Appl. No.: 794,472

[22] Filed: May 6, 1977

[51] Int. Cl.² .............................................. G01S 9/42
[52] U.S. Cl. .................................................... 343/7.7
[58] Field of Search ......................................... 343/7.7

[56] References Cited

U.S. PATENT DOCUMENTS

| | | | |
|---|---|---|---|
| 4,015,260 | 3/1977 | Campbell, Jr. ......................... | 343/7.7 |
| 4,021,804 | 5/1977 | Dounce et al. .................... | 343/7.7 X |

Primary Examiner—T.H. Tubbesing
Attorney, Agent, or Firm—William T. O'Neil

[57] ABSTRACT

A coherence reference signal device, and utilizing radar system therefor, in which a coherent reference signal is provided for phase detection of target echo signals for subsequent application to a canceller or other signal processor. The device recognizes the phase conditions throughout a given transmitted pulse (range bin) and provides this same phase information repetitively for each of n range bins of interest. A tapped sonic delay line of metallic glass material with input and output transducers and a summer circuit provide the coherent reference signal produced to a phase detector which also receives the echo signals, preferably both in the IF frequency domain.

7 Claims, 3 Drawing Figures

TAP #1 (TYPICAL)

RADAR MTI SYSTEM USING A NONCOHERENT TRANSMITTER

BACKGROUND OF THE INVENTION

1. Field of the Invention

The invention relates to radar systems generally and, more specifically, to moving target indicator subsystems therefor.

2. Description of the Prior Art

MTI (moving target indicator) radar has been intensively developed and exists in various forms, both analog and digital. The technical and patent literature extensively describes MTI and its variations. For example, the text, RADAR HANDBOOK, by Merrill I. Skolnik (McGraw-Hill Book Company, 1970) devotes chapter 17 to the subject. FIG. 4 of that chapter of the aforementioned text describes a typical prior art pulse radar MTI system. A pulsed microwave transmitter and receiver operating through a duplexer and common antenna system is standard, as is some means for "remembering" the transmitted RF phase. The frequency and phase of an IF domain coherent oscillator (coho) may be reset at each transmitted pulse and held throughout the pulse repetition period in such prior art systems. Return echo signals reduced to the IF frequency domain are phase detected against the coho, and the result is what is commonly referred to as bipolar video. Actually, these video signals have an amplitude and polarity in each range bin which is the result of vector addition against the coho in each pulse repetition period. Signals corresponding to moving targets assume polarities and amplitudes ranging between a maximum positive and a maximum negative value as a result of this phase detection over a number of succesive pulse repetition periods.

Fixed targets tend to assume invariant amplitude and polarity characteristics and, thus, are easily cancelled by subtraction of one signal train corresponding to a given pulse repetition period from an adjacent pulse repetition period on a continuous basis. For this, long delay line type cancellers are sometimes used, although digital memories and processors are also sometimes employed therefor. Signals corresponding to moving targets, because of their variation of amplitude and polarity among pulse repetition periods, are not cancelled; hence the term, moving target indicator.

Upon close examination of such prior art systems, it will be realized that the frequency of the coho cannot reflect the variations of transmitted energy phase history throughout the duration of each transmitted pulse. This transmitted pulse duration basically constitutes the range resolution cell of a pulsed radar system, the term "range bin" being applied thereto.

Normally, it is assumed that the phase-lock mechanism, employed for locking-in the coho during each transmitted pulse, chooses a compromise steady state value sometime during the transmitted pulse duration. Quite obviously, it would be advantageous, however, from the point of view of quality of cancellation if, during each range bin, the phase foibles of a noncoherent transmitter (such as a magnetron, etc.) could be faithfully reproduced in each subsequent range bin during the pulse repetition period (receiving time).

The manner in which the present invention provides a coherent reference generator, replacing the prior art coho device and providing a more faithful reproduction of the phase history throughout a transmitted pulse, will be evident as this description proceeds.

SUMMARY

It may be said to be the principal objective of the present invention to provide a simple and inexpensive, but nevertheless improved, coherent reference generator to replace the prior art coho in a pulsed MTI radar system, the said coherent reference generator providing a continuous noncoherent transmitter phase history within each of the $n$ successive range bins of $\tau$ duration each.

The transmitted radio frequency pulse is sampled by a fractional coupler associated with transmitter output, and a relatively large signal thereat is reduced to the IF frequency domain in a mixer following by IF amplification as necessary. This IF frequency domain transmitter sample is applied to a sonic delay line through an input electric-to-sonic transducer. The delay line is tapped at intervals of $\tau$, these signals being converted back to electric signals by a corresponding plurality of sonic-to-electric transducers, one at each tap.

The outputs of these tap transducers are summed and attenuated (or amplified) to the extent necessary, then applied to a phase detector as the phase reference signal against which received echo signals which have been down-converted to the IF domain in a received signal mixer with IF amplification, as necessary, are phase detected. The coherent reference signal, the mixer aforementioned, and the received echo signal mixer are preferably operated from the same stalo (stable local oscillator).

To obtain the coherent reference signal over the full repetition period, or that portion thereof to which MTI functions are to be applied in the given radar system, relatively long, high bandwidth delays are required. The invention employs a unique metallic glass member, preferably in a filametric form, so that it can be wound or otherwise folded to provide small-dimension packaging.

The details of a typical instrumentation for practicing the present invention will be set forth as this description proceeds.

DESCRIPTION OF THE PREFERRED EMBODIMENT

Figure 1:
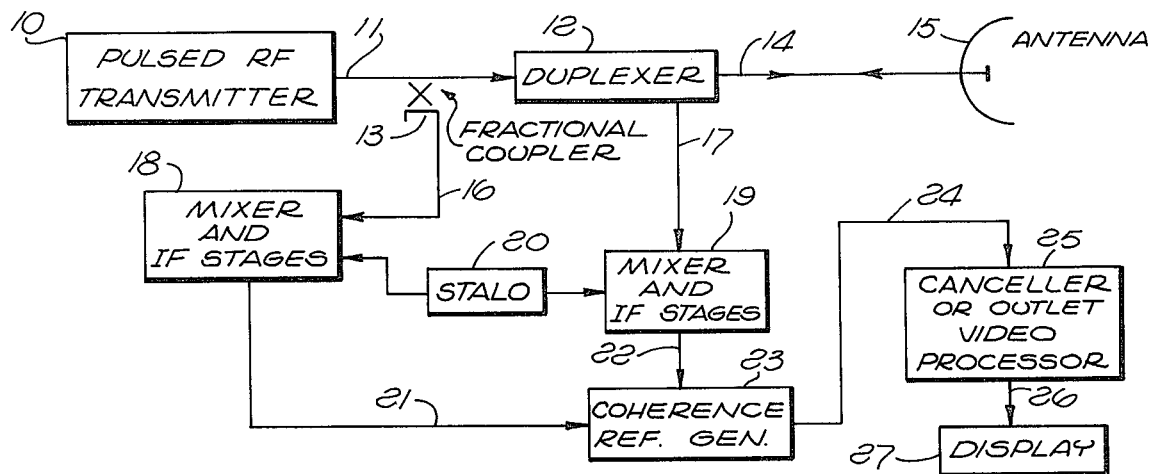
FIG. 1 is a block diagram of a pulse radar system including the additional elements required for implementation of the present invention.

Referring now to FIG. 1, a pulsed RF transmitter 10 is understood to be of the magnetron type, for example, and is basically noncoherent. Pulses at a predetermined repetition rate and of suitable microwave power are directed along transmission line 11 through duplexer 12, thence to antenna 15 by a transmission line 14. Received signals, corresponding to reflections from targets and clutter, enter antenna 15, and progress back through transmission line 14 and duplexer 12 to the mixer 19 via 17. RF amplifier stages would normally be also included in 19 such that the level of signal on output 22 is substantial.

A fraction of the RF transmittable energy 11 is diverted through a coupler 13 via lead 16 to another mixer 18 which may have IF amplification stages included as well, although the need for post-mixing amplification in 18 is much less than was the case in 19. This is because a relatively strong signal can easily be present on 16 according to the degree of coupling provided by 13. A stalo (stable local oscillator) 20 acts as a local oscillator for the mixing action in both 18 and 19, and therefore, the possibility of frequency and phase errors from separately local oscillator sources is eliminated.

The coherence reference generator 23 replaces the classical coho as a device for establishing a phase reference against which phase detection of received IF domain signals may be effected. The inputs to 23 thus are the direct transmitter pulse signal reduced to IF, as aforementioned, and present on lead 21, and the echo signals themselves also at IF on 22.

Figure 2:
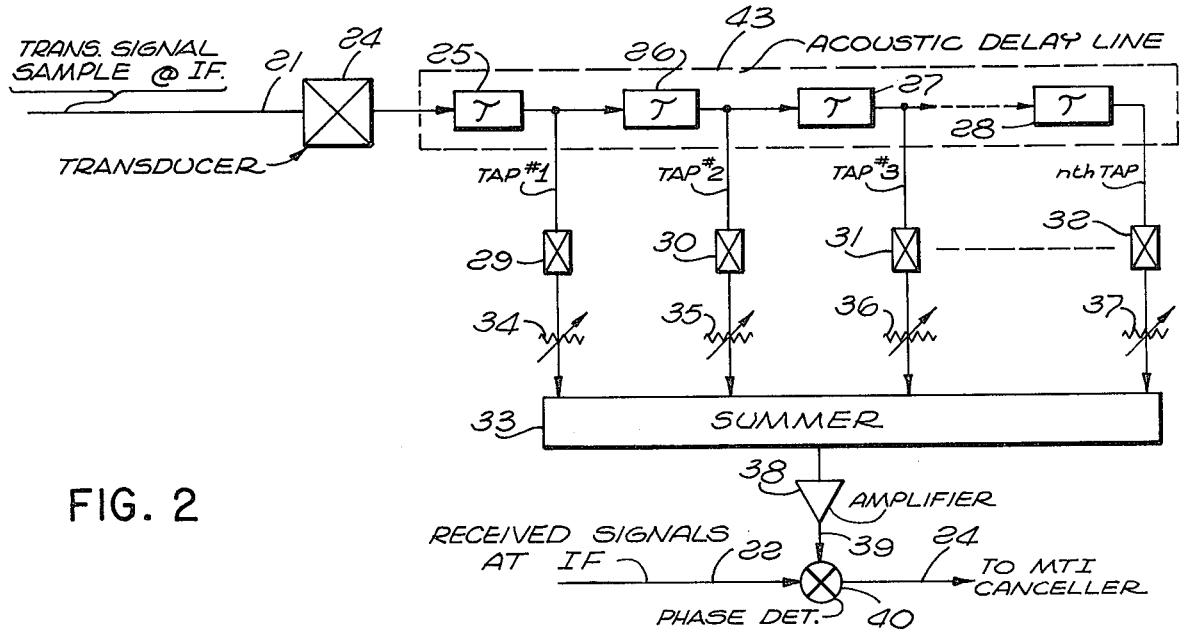
FIG. 2 is a detail of the delay line, summer and phase detection apparatus of the coherent reference generator of FIG. 1.

At this point, it is useful to refer to FIG. 2. A sonic or acoustic delay line 43, comprises a series of sections of a metallic glass sonic conductor, each providing a delay of $\tau$ and illustrated typically at 25, 26, 27 and 28. The signal on lead 21, as generated in the device of FIG. 1, is applied to a transducer 24 which converts it to a sonic signal. The general art of such transducers is known and well developed in such arts as sonar and in connection with prior art supersonic delay lines previously used in MTI as signal cancellers. In referring to a prior art MTI system in the text, RADAR HANDBOOK (previously identified), it may be noted that a quartz delay line was contemplated. Mercury supersonic delay lines are also known in the prior art, and both make use of excitation transducers of one type or another. In addition to transducers utilizing piezoelectric effect, magneto-strictive devices may also be employed. The former class of sonic transducers respond to electric fields to provide mechanical distortion of the piezoelectric material, and the latter respond mechanically to magnetic fields. The foregoing discussion of piezoelectric and magneto-strictive transducers will be seen to be applicable to the instrumentation in FIG. 2 as this description proceeds.

The preferred material for the delay sections, such as 25, 26, 27 and 28 in the combination of the present invention, is a metallic glass.

Metallic glasses, per se, constitute a relatively new class of engineering materials. These materials and considerable information about their properties and composition are disclosed in an article entitled, *Metallic Glasses*, by John J. Gillman, published in PHYSICS TODAY (May, 1975 issue). In addition to ductility, malleability, and other characteristics not normally attributed to glass, unexpectedly low values for attenuation of longitudinal sonic waves have been observed, particularly in Pd Si Ag glasses. Specifically, the Gillman technical paper quotes an attenuation figure as low as 0.06 dB/microsecond at 100 MHz in a $Pd_{80}Si_{16}Ag_4$ glass. This particular characteristic is of great interest in connection with the combination of the present invention, and Pd Si Ag metallic glasses are to be regarded as the preferred materials for the delay sections of FIG. 2.

Although the delay line of FIG. 2 could be constructed in the polygon solid body form, as frequently employed with quartz delay lines, a filamentary form of the metallic glass is considered preferable, since such a form lends itself to winding and other forms of compaction to minimize packaging volume. Still further, filaments of metallic glasses exploiting the unusual physical flexibility can be handled in much the same way as optical fiber glasses are now handled. That is, a considerable length of the filamentary metallic glass material can be employed without the accurate and expensive machining and other fabrication operations required with solid block polygon-shaped delay devices which obtain their long delays by multiple reflections internally (the configuration most often used in connection with quartz delay lines).

Proceeding with the description of FIG. 2, the longitudinal sonic wave, which corresponds to the signal wave on 21, is launched by transducer 24 into the delay line 43. At each interval $\tau$, that is, within each successive range bin, a tap is provided and a sonic-to-electric transducer provided thereat by transducers such as 29, 30, 31 and 32. These transducers, unlike 24, are best constructed of piezoelectric material according to well understood criteria so that their outputs are electric signals in the IF frequency domain. A summer circuit 33 and amplifier 38 (if necessary) provide a signal on 39 which is a series of IF signals corresponding to successive range bins throughout at least a part of pulse repetition period between successive transmitter pulses. During each of these successive range bins, the signal on 39 will then be understood to provide the entire phase history of the transmitter operation during the last previous transmitted pulse, reduced to the IF frequency domain, of course. Thus, a signal 39 may be referred to as continuously representative of transmitter pulse phase history, unlike the prior art coho arrangement which it replaces. The bipolar video output present on lead 24 at the output of phase detector 40 will thus be understood to be of the same form as the output of the phase detector in prior art pulsed radar MTI systems, although prior art cancellation residues due to the non-coherence of transmitter 10 are substantially reduced.

In FIG. 2, the variable attenuators 34, 35, 36 and 37 are shown to indicate that near the beginning of the line, the signal at each tap is stronger than that a number of range bins down the line. Accordingly, the attenuation at 34 would be relatively large and would be relatively small at 37 in order that the summer 33 would see inputs of equal amplitude. Conversely, amplification could be employed down the line, with increasing gain at each successive tap, although this is inherently a more expensive option.

The output signal from block 23 of FIG. 1 at 24 will be understood to be the output signal of phase detector 40 and is the so-called bipolar video typical of MTI systems as hereinbefore described.

Blcok 25 of FIG. 1 may be a typical canceller well known in the prior art and may also include a delay line constructed of metallic glasses in a manner similar to delay line 43, or alternatively, block 25 may be a fast Fourier transform device or a digital video processor of one form or another. The processing of the video at this point is not a part of the present invention, per se, nor is the display 27 a part of the novel combination, per se. Display 27 may, of course, be any one of a number of known types responding to the signals on 26 at the output of 25 to depict moving targets and other related data.

The signal on 24 will, of course, be recognized to contain Doppler frequency components from which corresponding target velocities may be ascertained through appropriate (known) instrumentation in 25.

Thus, the block 25 may also be alternatively referred to as a Doppler filter.

Figure 3:
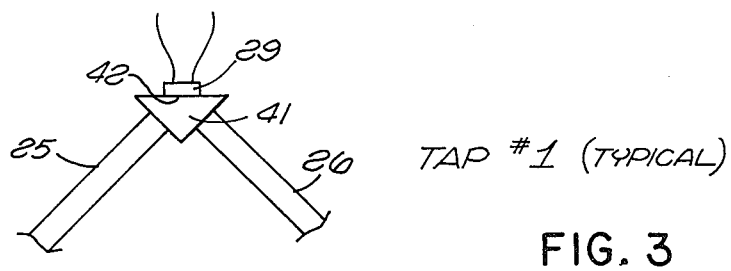
FIG. 3 is a detail showing a typical manner of tapping the sonic delay line of the filametric type with direct conversion to electrical signal at the tap.

Referring now to FIG. 3, a detail showing one typical method of tapping a sonic delay line carrying longitudinal acoustic signals is presented. In FIG. 3, it is assumed that the delay sections 25 and 26 of FIG. 2 are of the filamentary metallic glass types hereinbefore described and referenced from a technical literature. The metallic glasses proposed also have good fusability, and if a prism 41 were provided, the sonic waves can be caused to be reflected from the surface 42 into the next delay section 26 as illustrated. The prism 41 is, of course, the same metallic glass material as hereinbefore described and as used in 25 and 26. Fusing of these filamentary members 25 and 26 to 41 is therefore appropriate. A piezoelectric transducer 29 sensitive to the acoustic waves reflected at 42 is capable of providing the direct electrical tap contemplated by the showing of FIG. 2. This technique is comparable to that known in connection with the aforementioned polygon quartz body delay lines.

Various modifications are obviously possible within the spirit of the present invention. For just one example, it will be realized that all taps can be eliminated if the delay line 43 were actually n delay lines in parallel, each different from the previous one by the delay of $\tau$. The additional hardware required by such a variation is obviously considerable, but it is pointed out that the filamentary glass metallic material is so relatively easily handled (much as optical fiber delay lines are handled) and is so relatively small and inexpensive that it is within the realm of possibility to employ such an alternative delay line construction. Such plural delay lines in parallel would, of course, be driven from the same input transducer in parallel.

Other modifications will suggest themselves to those of skill in this art, once the concepts of the invention are understood.

What is claimed is:

1. A device for producing bipolar, phase compared MIT signals in a noncoherent MTI system which includes a pulsed RF transmitter and an echo signal receiver providing IF output signals comprising:

first means for deriving an IF pulse signal having instantaneous phase values continuously representative of the radio frequency phase over the duration of each transmitted RF pulse;

second means comprising a sonic delay line having an input and $n$ taps spaced $\tau$, where $\tau$ is substantially the duration of said transmitter pulses, and an electric-to-sonic signal transducer responsive to said first means output for driving the input of said delay line with a corresponding sonic pulse;

third means including a sonic-to-electric signal transducer connected to convert the sonic signal at each of said taps to a corresponding electric signal, and a summer circuit responsive to said electric signals to produce an IF phase reference signal $n\tau$ in duration at the output of said summer;

and fourth means including a phase detector circuit for phase comparing said echo receiver output signals against said IF phase reference signal to produce said bipolar signals.

2. Apparatus according to claim 1 in which said electric-to-sonic and said sonic-to-electric signal transducers are piezoelectric devices.

3. Apparatus according to claim 1 in which said sonic delay line comprises a metallic glass sonic conductor.

4. Apparatus according to claim 3 in which said metallic glass sonic conductor is further defined as a filament of metallic glass of a composition selected from a group including Pd-Si-Ag glasses.

5. Apparatus according to claim 3 in which said sonic conductor forming said delay line is a filamentary member having a composition selected from a group of Pd-Si-Ag glasses including $Pd_{80}Si_{16}AG_4$.

6. Apparatus according to claim 1 in which said electric-to-sonic transducer is a magneto-strictive device and said sonic-to-electric transducers are piezoelectric devices.

7. Apparatus according to claim 3 in which said sonic conductor is a filamentary member composed of $Pd_{80}Si_{16}Ag_4$ metallic glass material.

* * * * *